Figure 1:
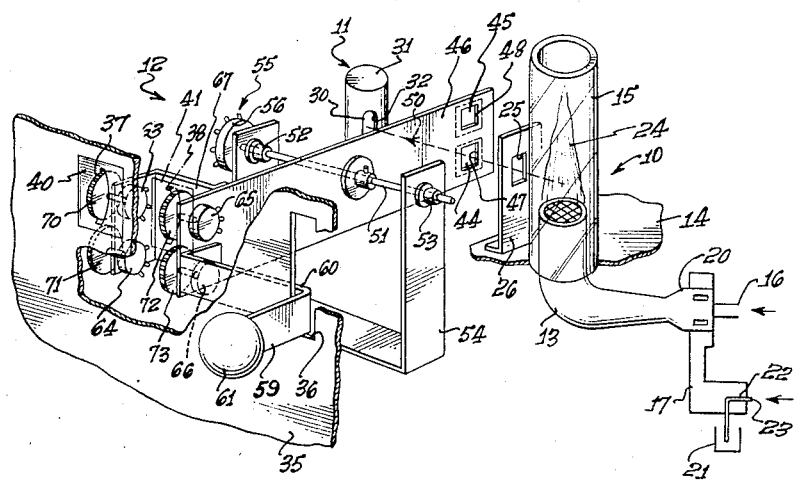

May 12, 1959     E. W. MOLLOY     2,885,926
SWITCHING MECHANISM FOR FLAME PHOTOMETERS AND THE LIKE
Filed May 27, 1955

Everett W. Molloy,
INVENTOR.

By His Attorneys
Harris, Kiech, Foster & Harris.

United States Patent Office 2,885,926
Patented May 12, 1959

2,885,926

SWITCHING MECHANISM FOR FLAME PHOTOMETERS AND THE LIKE

Everett W. Molloy, South San Gabriel, Calif., assignor to Beckman Instruments, Inc., Fullerton, Calif., a corporation of California Application May 27, 1955, Serial No. 511,607

6 Claims. (Cl. 88—23)

This invention relates to control mechanisms, and, more particularly, to a control mechanism for switching an instrument from one operating condition to another.

In many types of instruments, it is desired that the instrument be capable of measuring or controlling more than one operation or reaction. This is conventionally accomplished by mechanically and/or electrically switching the instrument from the first operation and then switching it to the second operation. However, it is usually necessary to adjust one or more parameters of the instrument when such a shift is made and then to readjust the parameter upon returning the instrument to the first operation or moving to a third operation. It is an object of the invention to provide a switching mechanism for an instrument having more than one operating condition by which the instrument may be switched from one operating condition to another without requiring a corresponding parameter adjustment.

It is another object of the invention to provide a switching mechanism for an instrument having more than one operating condition and an adjustment means for each operating condition in which only the adjustment means corresponding to the then-present operating condition can be varied.

The invention may be used in conjunction with a photometer wherein one or more adjustment means and a light control means are required for each operating condition. The photometer would include a light source, a light sensing element and an indicator circuit coupled to the sensing element, the light control means being positionable between the source and the sensing element, and the adjustment means being part of the indicator circuitry.

A further object of the invention is to provide a switching mechanism for a photometer in which a single actuator simultaneously positions a particular filter or light control means in the light path and positions a particular adjustment means in an adjusting position, and connects this adjustment means into the indicator circuitry.

The invention also comprises novel details of construction and novel combinations and arrangements of parts, which will more fully appear in the course of the following description. An embodiment of the invention as applied to a flame photometer will be shown and described; however, the invention is applicable to other instruments, the following being given by way of illustration or example.

Figure 2:
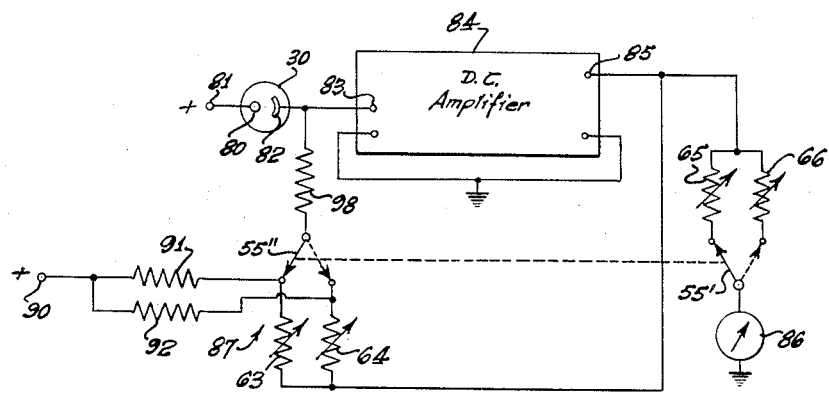

In the drawings, wherein identical numerals on the various figures refer to the same elements:

Fig. 1 is an isometric view of a portion of a flame photometer showing a preferred embodiment of the invention, and Fig. 2 is a schematic diagram of the circuitry associated with the embodiment of Fig. 1.

The flame photometer of Fig. 1 includes a light source 10, a light sensing element 11 and a switching mechanism 12. The light source includes a burner 13 extending upward through a deck plate 14, the flame end of the burner 13 being surrounded by a windowed or transparent chimney 15 resting on or secured to the plate 14. A combustible gas is fed to the burner 13 under pressure through an inlet 16 and the material being analyzed is fed to the burner through a pipe 17, the gas and the material being mixed in a chamber 20 of the burner 13. The samples to be analyzed in the embodiment described herein are in liquid form. The liquid is sucked up from a container 21 by an aspirator 22, a stream of compressed air or other gas being supplied to the aspirator at an inlet 23. The stream carries the vaporized liquid through the pipe 17 into the mixing chamber 20, the vaporized liquid and the combustible gas entering the combustion zone together and producing a flame 24. An opening 25 is provided in a baffle 26 mounted on the plate 14 to limit the amount of light and also the heat radiated from the flame, the opening forming a beam directed toward the light sensing element 11. This light sensing element 11 may include a phototube 30 covered by a housing 31 having a slot 32 therein for admission of light to the phototube.

An instrument embodying the invention may be mounted behind a panel or in a container which provides for limited access to the mechanism thereof. The switching mechanism 12 of Fig. 1 is shown mounted behind a panel 35 having a control slot 36 and adjustment slots 37, 38, the adjustment slots 37, 38 being located in respective and identical recessed or concave sections 40, 41 in the panel 35. The slot 38 and the concave section 41 are shown in phantom, the panel 35 being broken away at this point.

Light filters 44 and 45 are mounted on a movable element shown as a beam 46, the filters respectively covering openings 47, 48 in the beam. The beam 46 is mounted so that it is movable to position the filter 44 or the filter 45 in the light path 50, shown by a dotted arrow, between the flame 24 and the phototube 30. The beam 46 may be pivotally mounted by a shaft 51 which rotates in a pair of bushings 52, 53 in a U-shaped bracket 54. A switch 55 is positioned so as to be actuated by the movement of the beam 46, having a number of switching positions corresponding to the number of filters. It is preferred that the switch 55 be of the rotary type having a case or fixed element 56 mounted on the bracket 54 and a shaft or rotating element driven by the beam movement. In the embodiment of Fig. 1, the shaft 51 is the shaft of the switch 55 or is connected thereto, the shaft acting both as a support for the pivoting beam 46 and as a means for coupling the beam movement to the switch. This combination of results permits a simple yet rugged construction of the switching mechanism.

An end 59 of a substantially Z-shaped bracket 60 attached to the beam 46 extends through the slot 36, the end 59 having a spherical knob 61 mounted thereon in front of the panel 35. The beam may be moved manually by means of the knob. The slot 36 is dimensioned so that when the bracket 60 rests against the lower edge of the slot, acting as a stop, the filter 44 is centered in the light path 50, and so that when the bracket rests against the upper edge of the slot, acting as a stop, the filter 45 is centered in the light path. If three or more filters were mounted on the beam, detent positions could be provided along the slot so that each filter could be positioned in the light path as required.

It is also desired that the movement of the beam 46 place parameter adjusting elements of the instrument in an adjusting position. In the embodiment of Fig. 1, this is accomplished by mounting variable resistors or potentiometers 63, 64, 65, 66 on the beam, two of the potentiometers 65, 66 being mounted directly on the beam 46, and two, 63, 64, being mounted on a bracket 67 extending from the beam. The potentiometers have knurled wheels 70, 71, 72, 73 mounted on the respective shafts thereof, a portion of the wheels 70 and 72 being shown as extending through the adjustment slots 37 and 38, respectively. When the beam 46 is moved from the position shown in Fig. 1 (hereinafter referred to as a condition A) to a position with the bracket 60 resting against the upper end of the control slot 36 (hereinafter referred to as condition B), the wheels 70 and 72 are moved away from the adjustment slots and the wheels 71 and 73 are moved into the adjusting position with portions of the wheels extending through the slots. This movement of the beam also changes the filter in the light path 50 and actuates the switch 55, as previously described.

An indicator circuit for use with the photometer of Fig. 1 is shown schematically in Fig. 2. Therein, a positive voltage is supplied to an anode 80 of the phototube 30 through a terminal 81. The output from the phototube is coupled from a cathode 82 to an input 83 of a D.C. amplifier 84. The output of the amplifier is coupled from an output terminal 85 to a meter 86 through the potentiometers 65, 66, and a section 55' of the switch 55. The output terminal 85 is also coupled to the input terminal 83 through a zeroing circuit 87 including the potentiometers 63, 64, a second section 55" of the switch 55 and a resistor 88. A positive voltage is supplied to the zeroing circuit through a terminal 90 and resistors 91 and 92. The switch sections 55' and 55" are shown in solid lines for condition A and in dotted lines for condition B.

In the initial operation of the instrument, there is no sample in the container 21. With the flame 24 on and the switching mechanism in condition A, the wheel 70 of the potentiometer 63 is turned until the meter 86 indicates zero output. Then the instrument is calibrated for condition A by placing a standard sample containing a known concentration of a material, A, in the container 21, the sample being injected into the flame 24. There is an increase in the amount of light reaching the phototube due to excitation of the sample material by the flame, and a corresponding indication on the meter 86. While the sample is being consumed, the wheel 72 of the potentiometer 65 is turned until the meter indication is correct for the known concentration of material A in the standard. The instrument is now ready for measuring the amount of material A present in unknown samples.

In a conventional photometer, in order to measure the amount of a second material, B, present in a sample, it would be necessary to reset the potentiometers 63 and 65 according to the above procedure using a sample having a known amount of material B. As an additional operation, the filter required for detecting material A would have to be replaced by another filter suitable for material B. Then a later sample could not be analyzed for material A until another calibration adjustment and filter substitution were made.

When it is desired to analyze a sample for material B in an instrument embodying the present invention, the switching mechanism is moved to condition B. The zeroing potentiometer 64 and the calibration potentiometer 66 are switched into the circuit and the wheels 71 and 73 are moved into the access slots for adjusting, the potentiometers associated with condition A being moved away from the adjusting position although retaining the desired adjustment. Also in the same motion of the switching mechanism the filter 45 automatically replaces the filter 44. After zeroing and calibrating the instrument in condition B for material B, samples may be analyzed for either materials A or B, as desired, without regard to the order of testing, the only requirement being that the switching mechanism be moved to the operating condition corresponding to the test to be made. Moreover, by coupling the filters to the switching mechanism and making accessible to the operator at any one time only the adjustments required to analyze for one desired sample material, the possibility of confusion and error is substantially eliminated.

An exemplary embodiment of the invention has been disclosed and discussed; however, it will be understood that other applications of the invention are possible, and that the embodiment disclosed may be subjected to various changes, modifications and substitutions without necessarily departing from the spirit of the invention.

I claim as my invention:

1. In a switching mechanism for an instrument having a plurality of operating conditions, the combination of: an actuating member; a plurality of mechanically variable adjustment means, each of said plurality of adjustment means being sequentially movable by said actuating member to a single adjusting location; and switch means operable by said actuating member, said actuating member simultaneously moving one of said adjustment means to said adjusting location and operating said switch means to connect the instrument to said one adjustment means.

2. In a switching mechanism for an instrument, the combination of: an actuating member; a panel having an access opening therein; a plurality of mechanically variable adjustment means mounted on said actuating member, said actuating member being movable to sequentially position each of said adjustment means at said access opening; and switch means including a moving element and a fixed element, said moving element being mounted on said actuating member, said switch means being operated by said actuating member to connect the instrument to the one of said plurality of adjustment means positioned at said access opening.

3. In a switching mechanism for an instrument, the combination of: switch means including a rotating element and a fixed element; support means mounted on said rotating element; a plurality of mechanically variable adjustment means mounted on said support means; and a control member engaging said support means, said control member being capable of rotating said support means and said rotating element, said rotation sequentially positioning each one of said plurality of adjustment means in a single adjusting location and simultaneously actuating said switch means to connect the instrument to said one adjustment means.

4. In a switching mechanism for an instrument having an adjustment circuit and a plurality of operating conditions, the combination of: a switching arm having a switching position corresponding to each of said operating conditions; a panel having an access opening therein; a plurality of circuit impedance units mounted on said switching arm, each of said units having an actuating element for varying the impedance thereof, said switching arm positioning a corresponding actuating element at said access opening when in each of said switching positions; and a switch actuated by said switching arm and electrically connected to each of said units for electrically connecting the unit which is positioned at said access opening into the adjustment circuit simultaneously with the movement of such unit to said access opening.

5. In a switching mechanism for a measuring instrument having a sensing element, a measuring circuit, and a plurality of operating conditions, the combination of: a plurality of mechanically variable, circuit parameter adjustment means, one of said plurality of adjustment means being required for each of said operating conditions; an actuating member movable to sequentially position each of said plurality of adjustment means in an adjusting position where the adjustment means so positioned may be mechanically varied, the particular adjustment means so positioned corresponding to the particular operating condition desired; and switch means operated by said actuating member, said switch means connecting said measuring circuit of the instrument with the particular adjustment means positioned in said adjusting position.

6. In a switching mechanism for a photometer having a light sensing element and a measuring circuit, the combination of: an actuating member; an adjustment protection panel having an access opening therein; a plurality of mechanically variable, measuring circuit parameter adjustment means, each of said plurality of adjustment means being movable sequentially by said actuating member to a single adjusting location at said access opening where the adjustment means so moved may be mechanically varied; a plurality of light control means each of said plurality of light control means being movable by said actuating member to a controlling location for controlling the passage of light to the light sensing element; and switch means operable by said actuating member for selectively connecting each of said adjustment means to the measuring circuit, said actuating member simultaneously and synchronously moving one of said adjustment means to said adjusting location and moving said switch means to connect said one of said adjustment means into the measuring circuit and moving one of said light control means to said controlling location.

References Cited in the file of this patent

UNITED STATES PATENTS

| | | |
|---|---|---|
| 1,985,303 | Trogner | Dec. 25, 1934 |
| 2,356,238 | Gillett et al. | Aug. 22, 1944 |
| 2,439,857 | Millikan | Apr. 20, 1948 |
| 2,735,330 | Polster | Feb. 21, 1956 |